Jan. 17, 1956
A. N. MARINELLI
2,730,912
SECTIONAL CRANKSHAFT
Filed May 23, 1952
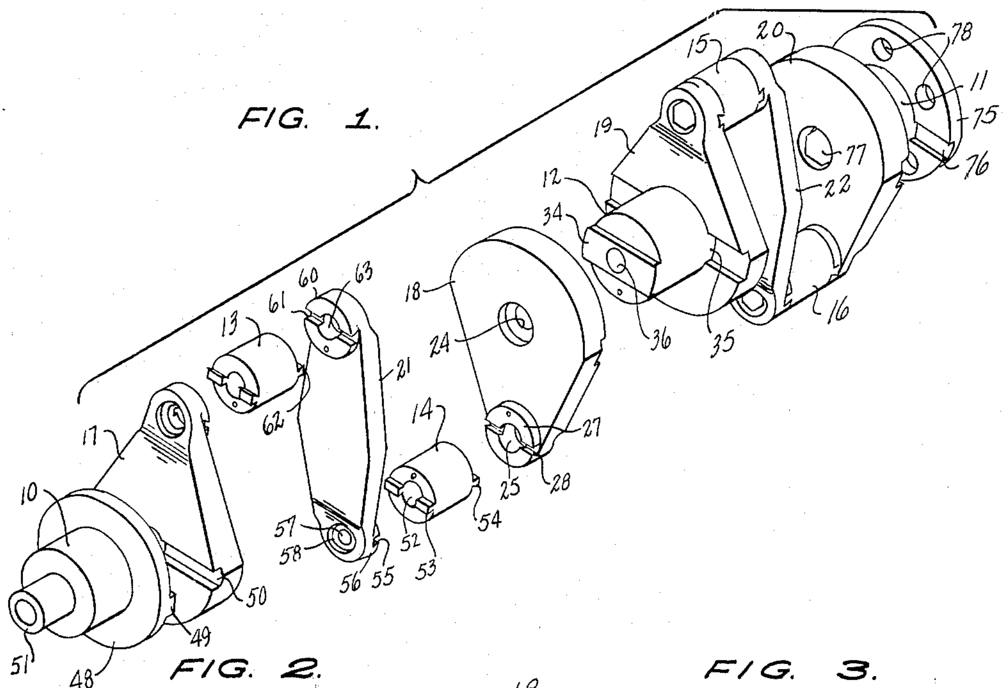
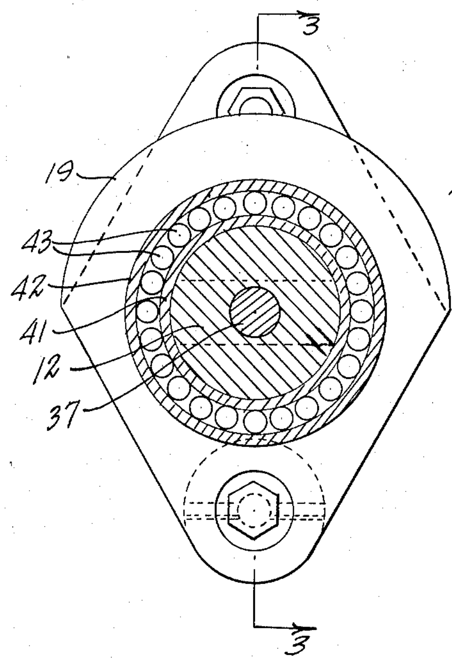
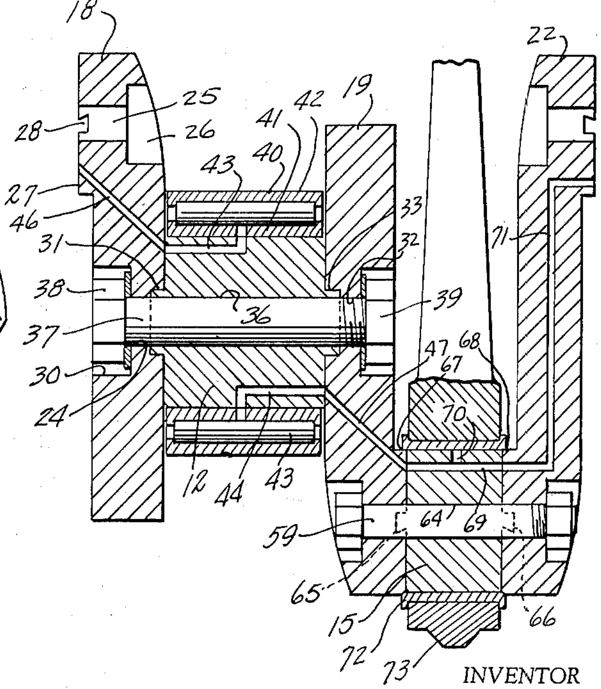
INVENTOR
ARTHUR N. MARINELLI,
BY
McMorrow, Berman + Davidson
ATTORNEYS.

United States Patent Office 2,730,912

Patented Jan. 17, 1956

2,730,912

SECTIONAL CRANKSHAFT

Arthur N. Marinelli, Hawthorne, Nev.

Application May 23, 1952, Serial No. 289,526

2 Claims. (Cl. 74—597)

This invention relates to crankshafts, such as are used in multicylinder, in-line engines, and more particularly to a crankshaft including a plurality of separable parts or sections, any one of which can be removed from the crankshaft without disturbing the other parts.

It is among the objects of the invention to provide an improved engine crankshaft having a plurality of main bearing pins and a plurality of crank bearing pins connected to the main bearing pins by crank cheeks in which the main bearing pins, crank pins and crank cheeks are provided as separate elements or parts and detachably connected together, so that any bearing pin can be removed from the crankshaft without removing the crankshaft from the associated engine or disturbing the other bearing pins; in which the separate parts are solidly united to provide a substantially rigid crankshaft and the several bearing pins are positively held against rotation relative to each other and the crank cheeks; in which lubricant passages are provided through the several parts and are united to extend continuously the length of the crankshaft when the several parts are connected together; and in which one piece antifriction bearings, such as roller or needle bearings, are mounted one on each main bearing pin, or one on each bearing pin, if desired.

Other objects and advantages will become apparent from a consideration of the following description and the appended claims in conjunction with the accompanying drawing wherein:

Figure 1 is an exploded perspective view of a crankshaft illustrative of the invention;

Figure 2 is a transverse cross sectional view of the crankshaft taken through one of the main bearings and showing a one-piece antifriction bearing mounted on the main bearing; and Figure 3 is a longitudinal cross sectional view of the fragmentary portion of the crankshaft taken on the line 3—3 of Figure 2.

With continued reference to the drawing, the crankshaft illustrated includes front and rear main bearing pins or arbors 10 and 11, and an intermediate main bearing pin 12 disposed substantially at the mid-length location of the crankshaft. Crank bearing pins 13 and 14 are disposed between the main bearing pins 10 and 12 and are angularly spaced approximately 180 degrees from each other and crank bearing pins 15 and 16 are disposed between the main bearing pins 12 and 11 and are also angularly spaced approximately 180 degrees from each other. In the arrangement illustrated, the crank bearing pins 14 and 15 at respectively opposite ends of the intermediate main bearing pin 12 are also angularly spaced apart approximately 180 degrees, but it is to be understood that the crank throws of the crankshaft may be arranged as desired and also that the number of bearing pins may be increased or decreased without in any way exceeding the scope of the invention.

A counterweighted crank cheek 17 has a large or counterweighted end connected to one end of the front main bearing 10 and its small end connected to the adjacent end of the crank bearing pin 13. A similar counterweighted crank cheek 18 has its larger end connected to the intermediate main bearing pin 12 at the front end of the latter and its smaller end connected to the crank bearing pin 14 at the rear end of the crank bearing pin. A counterweighted crank cheek 19 has its larger end connected to the intermediate main bearing pin 12 at the rear end of the pin 12 and its smaller end connected to the crank bearing pin 15 at the front end of the latter and a fourth counterweighted crank cheek 20 has its larger or counterweighted end connected to the rear main bearing pin 11 at the front end of the latter and its smaller end connected to the rear end of the crank bearing pin 16. A non-counterweighted or substantially symmetrical crank cheek 21 is connected between the rear end of the crank bearing pin 13 and the front end of the crank bearing pin 14 and a similar non-counterweighted or substantially symmetrical crank cheek 22 is connected between the rear end of the crank bearing pin 15 and the front end of the crank bearing pin 16.

Each of the counterweighted crank cheeks is provided with apertures, as indicated at 24 and 25, for the crank cheek 18, with the aperture 24 disposed adjacent the center of the large or counterweighted end of the crank cheek, and the aperture 25 disposed adjacent the smaller end of the crank cheek. The crank cheek is counterbored at the end of the aperture or bore 25 adjacent the main bearing pin 12, as indicated at 26, and at the opposite end of the aperture 25 the crank cheek is provided with an annular or cylindrical boss 27 having a flat outer face perpendicular to the axis of the aperture 25 and provided with a transversely or diametrically extending groove 28 comprising two groove parts disposed at diametrically opposite sides of the aperture 25.

The crank cheek 18 is counterbored, as indicated at 30, at the end of the aperture 24 remote from the main bearing pin 12 and is provided in its side adjacent the main bearing pin 12 with a transversely extending groove 31 which extends across the corresponding end of the aperture 24.

The counterbalanced crank cheek 19 is provided adjacent the center of its large or counterweighted end with a counterbored aperture 32 corresponding to the aperture 24, and in its side adjacent the main bearing pin 12 with a transversely extending groove 33 which extends across the corresponding end of the aperture 32.

The main bearing pin 12 is provided with diametrically extending tongues or keys 34 and 35 on its respectively opposite ends which keys having their longitudinal center lines substantially in a common plane and fit into the crank cheek grooves 31 and 33 respectively, and is also provided with a coaxial bore 36 which registers with the apertures 24 and 32 in the crank cheeks 18 and 19.

A bolt 37 extends through the apertures 24 and 33 and through the bore 36 in the main bearing pin 12 and has at one end a head 38 received in the counterbore 30 in the crank cheek 18. The bolt 37 is screw threaded at its other end and receives a nut 39 which is received in the counterbore at the outer end of the bore 32 in the crank cheek 19, so that the bolt holds the crank cheeks 18 and 19 and the main bearing pin 12 firmly together and the tongue and groove formations on the main bearing pin and the crank cheeks hold the bearing pin against rotation relative to the crank cheek.

An antifriction bearing 40, such as a roller or needle bearing, having one-piece inner and outer races 41 and 42 and antifriction roller or needle elements 43 between the races is mounted on the bearing pin 12, this antifriction bearing being slipped on the bearing pin from one end of the latter during the assembly of the crankshaft.

Lubricant passages 43 and 44 are provided in the bearing pin 12 extending inwardly of the bearing pin from respectively opposite ends of the latter and disposed at respectively opposite sides of the bore 36. These passages extend to the cylindrical surface of the bearing pin intermediate the length of the latter and communicate with apertures in the inner race 41 of the bearing 40 to supply lubricant to the antifriction elements 43 of the bearing. The crank cheeks 18 and 19 are provided with diagonal lubricant passages 46 and 47 respectively, which extend from the outer faces of the bosses, such as the boss, 27, on the smaller ends of these crank cheeks to the outer ends of the passages 43 and 44 respectively.

The counterweighted crank cheeks 17 and 20 are constructed exactly the same as the crank cheeks 18 and 19 described above, so that a detailed description of the latter crank cheeks appears to be unnecessary for the purposes of the present disclosure.

The front main bearing pin 10 has an annular or cylindrical flange 48 on its rear end disposed coaxially thereof, and this flange has a diameter substantially equal to the diameter of the larger end of the crank cheek 17 and has on its side adjacent this crank cheek a diametrically extending tongue or key 49 which is received in a diametrically extending groove 50 provided across the larger end portion of the crank cheek 17. The bearing pin 10 is provided with a coaxial bore and the crank cheek 17 is provided with a counterbored aperture to receive a bolt, similar to the bolt 37, for holding the front main bearing pin to the crank cheek 17, and at its front end the front main bearing pin 10 is provided with a coaxial cylindrical extension 51 of reduced diameter.

The crank bearing pin 14 is provided with a coaxial bore 52 and is provided at each end with diametrically extending key or tongue formations 53 and 54, each comprising end portions disposed at diametrically opposite sides of the corresponding ends of the bore 52. The key formation 54 is received in the groove 28 in the boss 27 of the crank cheek 18 and the key formation 53 is received in a diametrically extending groove 55 provided in the outer face of a cylindrical boss 56 at the corresponding end of the crank cheek 21. The crank cheek 21 is provided with an aperture 57 extending coaxially through the boss 56 having a counterbore 58 in its end remote from the boss and a bolt, such as the bolt 59 illustrated in Figure 3 in connection with the crank pin bearing 15, extends through the crank cheek apertures 57 and 25 and through the bore 52 in the crank bearing pin 14 to secure the crank cheeks 18 and 21 and the crank bearing pin 14 together.

The crank cheek has at its other end a cylindrical boss 60 disposed at the side thereof opposite the boss 56 and provided with a diametrically extending groove 61 to receive the key formation 62 on the adjacent end of the crank bearing pin 13. The crank cheek 21 is provided with an aperture 63 concentric with the boss 60 which aperture has a counterbore at the end thereof remote from the boss 60 to receive the head or nut of a connecting bolt.

The crank bearing pin 15, particularly illustrated in Figure 3, is similar in all respects to the bearing pin 14 described in detail above and includes, in addition to the coaxial bore 64 and key formations 65 and 66 received in grooves provided in bosses 67 and 68 on the crank cheeks 19 and 22 respectively, a lubricant passage 69 extending longitudinally therethrough at a location spaced from the bore 64 and connected intermediate its length by a branch passage 70 with the cylindrical surface of the crank bearing pin. The channel 69 connects at one end with the channel 47 in the crank cheek 19 and at its other end with one end of a channel 71 in the crank cheek 22. The key formations 65 and 66 are each under cut at an angle on one side to provide a dovetailed construction, so that the crank pin can be assembled with the associated crank cheeks in only one rotational position, thereby assuring the alignment of the lubricant passage 69 with the lubricant passages in the associated crank cheeks.

The keys on the ends of the other crank pins are similarly under cut for the same purposes and also to increase the strentgh of the connections between the crank pins and crank cheeks.

A plain, one-piece bearing bushing 72 surrounds the crank bearing pin 15 and receives the large end of the associated connecting rod 73.

It is contemplated that antifriction bearings, such as the bearings 40, having one-piece inner and outer races, will be mounted one on each of the main bearing pins 10, 11 and 12, and that plain bearings, such as the bushing 72, will be mounted one on each of the crank bearing pins 13, 14, 15 and 16. Antifriction bearings similar to the bearings 40 may, however, be mounted one on each of the crank bearing pins, if desired, without in any way exceeding the scope of the invention.

A circular, disc shaped flange member 75 is disposed at the rear end of the rear main bearing 11 and is provided in its face adjacent the rear end of the main bearing 11 with a diametrically extending groove 76, the main bearing pin 11 being provided on its rear end with a tongue or key formation received in the groove 76. The flange 75 is provided with a central aperture and this flange, the rear main bearing pin 11 and the crank cheeek 20 are secured together by a bolt 77 which extends through apertures in the crank cheek and the flange and through a coaxial bore in the bearing pin 11, the bolt 77 being similar to the bolt 37 illustrated in Figure 3.

Flange 75 is provided with angularly spaced apart apertures 78 adjacent its periphery for securing this flange to an engine driven component, such as the driving portion of a friction clutch.

It will be noted that the grooves provided in the crank cheeks are disposed substantially perpendicular to the longitudinal center lines of the crank cheeks and extend entirely across the corresponding areas of the crank cheeks, such as the crank cheek bosses and the larger ends of the counterweighted crank cheeks, so that the corresponding bearing pins can be slid along these grooves from between the associated crank cheeks when the bolts securing the several bearing pins in place are selectively removed. With this arrangement, any selected bearing pin can be removed from the crankshaft and replaced by a new pin without removing the crankshaft from the associated engine and without disturbing any other part of the crankshaft.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A crankshaft comprising main bearing pins disposed one at each end and at least one intermediate the length of the crankshaft, crank bearing pins disposed between each two adjacent main bearing pins, crank cheeks interconnecting said bearing pins and having apertures disposed one near each end of each crank cheek and cylindrical bosses respectively surrounding said apertures at the sides of said crank cheeks at which the corresponding crank bearing pins are connected, each of said bearing pins having a bore extending longitudinally therethrough, bolts extending one through each bearing pin and through the corresponding apertures in the associated crank cheeks securing said bearing pins and crank cheeks together, each of said crank cheek bosses having a groove extending diametrically thereof in the end thereof remote from the corresponding crank cheek and each bearing pin having tongues extending diametrically one across each end thereof and received in corresponding grooves in said crank cheek bosses to maintain said bearing pins against rotation relative to said crank cheeks and lubricant passages in said bearing pins and crank cheeks, said grooves and said tongues being undercut at corresponding sides to predetermine the rotational positions of said crank cheeks relative to the corresponding bearing pins, and to align the lubricant passages in said bearing pins with corresponding lubricant passages in said crank cheeks.

2. A sectional crankshaft comprising separate main bearing pins and crank bearing pins each having a bore extending coaxially therethrough, crank cheeks disposed one between each two adjacent bearing pins and each having spaced apart apertures extending therethrough and registering with the bores of the corresponding bearing pins, bolts extending one through each bearing pin bore and through the registering crank cheek apertures securing said bearing pins and crank cheeks together, said crank cheeks having grooves therein extending across the ends of said apertures at the sides of said crank cheeks at which said bearing pins are connected and to the adjacent edges of said crank cheeks with their longitudinal center lines substantially perpendicular to the longitudinal center lines of the corresponding crank cheeks and each of said bearing pins having tongues extending diametrically one across each end thereof and slidably received in corresponding crank cheek grooves to hold said bearing pins against rotation relative to said crank cheeks, and lubricant passages in said bearing pins and crank cheeks, said grooves and said tongues being undercut at corresponding sides to predetermine the rotational positions of said crank cheeks relative to the corresponding bearing pins, to align the lubricant passages in said bearing pins with corresponding lubricant passages in said crank cheeks, and to facilitate selective removal of said bearing pins from between the associated crank cheeks without the necessity of removing the entire crank shaft from an associated engine.

References Cited in the file of this patent

UNITED STATES PATENTS

| | | |
|---|---|---|
| 214,028 | Dick, Jr. | Apr. 8, 1879 |
| 290,565 | Fry | Dec. 18, 1883 |
| 296,368 | Trump | Apr. 8, 1884 |
| 1,363,957 | Cote | Dec. 28, 1920 |
| 1,431,416 | Parsons et al. | Oct. 10, 1922 |
| 1,845,110 | Wright | Feb. 16, 1932 |
| 2,324,373 | Dusevoir | July 13, 1943 |
| 2,331,541 | Dusevoir | Oct. 12, 1943 |
| 2,364,109 | Taylor | Dec. 5, 1944 |

FOREIGN PATENTS

| | | |
|---|---|---|
| 6,778 of 1885 | Great Britain | June 4, 1885 |
| 23,360 of 1898 | Great Britain | Nov. 7, 1898 |
| 909,830 | Great Britain | Jan. 10, 1946 |